(12) United States Patent
Ramos

(10) Patent No.: US 11,808,613 B2
(45) Date of Patent: Nov. 7, 2023

(54) COMPOSITE SINGLE-MODE/MULTIMODE OPTICAL FIBER

(71) Applicant: Fibercore Limited, Southampton (GB)

(72) Inventor: Rogerio Tadeu Ramos, Eastleigh (GB)

(73) Assignee: Fibercore Limited, Southampton (GB)

( * ) Notice: Subject to any disclaimer, the term of this patent is extended or adjusted under 35 U.S.C. 154(b) by 419 days.

(21) Appl. No.: 17/254,883

(22) PCT Filed: Jun. 7, 2019

(86) PCT No.: PCT/GB2019/051596
§ 371 (c)(1),
(2) Date: Dec. 22, 2020

(87) PCT Pub. No.: WO2019/243777
PCT Pub. Date: Dec. 26, 2019

(65) Prior Publication Data
US 2021/0364328 A1    Nov. 25, 2021

(30) Foreign Application Priority Data

Jun. 22, 2018    (GB) ...................................... 1810272

(51) Int. Cl.
*G01D 5/353*    (2006.01)
*E21B 47/07*    (2012.01)
(Continued)

(52) U.S. Cl.
CPC .......... *G01D 5/3538* (2013.01); *E21B 47/07* (2020.05); *E21B 47/114* (2020.05); *G01H 9/004* (2013.01);
(Continued)

(58) Field of Classification Search
None
See application file for complete search history.

(56) References Cited

U.S. PATENT DOCUMENTS 4,465,334 A * 8/1984 Siemsen ................ G02B 6/105
385/127
5,627,934 A * 5/1997 Muhs ................ G02B 6/03633
385/127
(Continued)

FOREIGN PATENT DOCUMENTS

CN    107949792 A    4/2018
DE    102016202662 A1    9/2017
(Continued)

OTHER PUBLICATIONS

English language abstract for JP 2011-529200 A extracted from espacenet.com database on Apr. 6, 2022, 1 page.
(Continued)

*Primary Examiner* — Brandi N Hopkins
*Assistant Examiner* — Nigel H Plumb
(74) *Attorney, Agent, or Firm* — Howard & Howard Attorneys PLLC

(57) ABSTRACT

A composite optical fiber is provided for permitting sensing of multiple parameters. The optical fiber is for incorporation into a sensing system, the optical fiber comprising: a single mode optical fiber core, a multimode optical fiber core, and an optical fiber cladding layer surrounding the single mode optical fiber core and the multimode optical fiber core. The optical fiber provided preferably enables multiple sensing and/or measurements to take place at a single location and at a single time.

17 Claims, 7 Drawing Sheets

(51) Int. Cl.
*G01H 9/00* (2006.01)
*G01K 11/32* (2021.01)
*G02B 6/02* (2006.01)
*E21B 47/113* (2012.01)
*G02B 6/028* (2006.01)

(52) U.S. Cl.
CPC .......... *G01K 11/32* (2013.01); *G02B 6/02042* (2013.01); *G02B 6/0285* (2013.01)

(56) References Cited

U.S. PATENT DOCUMENTS

| | | | | |
|---|---|---|---|---|
| 6,487,340 | B2* | 11/2002 | Enomoto | G02B 6/02095 385/28 |
| 7,899,294 | B2* | 3/2011 | Chen | G02B 6/02261 385/127 |
| 2002/0114599 | A1* | 8/2002 | Halgren | G02B 6/262 385/127 |
| 2012/0127459 | A1* | 5/2012 | Handerek | G01D 5/35364 356/73.1 |
| 2013/0287353 | A1* | 10/2013 | Molin | G02B 6/0281 385/126 |
| 2014/0285793 | A1* | 9/2014 | Jaaskelainen | G01L 1/242 356/32 |
| 2014/0285875 | A1* | 9/2014 | Jaaskelainen | G01V 8/16 359/341.1 |
| 2015/0063754 | A1 | 3/2015 | Li et al. | |
| 2016/0209598 | A1* | 7/2016 | Jaaskelainen | G02B 6/32 |
| 2018/0259551 | A1 | 9/2018 | Villnow | |

FOREIGN PATENT DOCUMENTS

| | | |
|---|---|---|
| GB | 2355541 A | 4/2001 |
| JP | S61122612 A | 6/1986 |
| JP | 2011529200 A | 12/2011 |
| WO | 00042459 A1 | 7/2000 |
| WO | 2018136477 A1 | 7/2018 |

OTHER PUBLICATIONS

English language abstract for WO 00/042459 A1 extracted from espacenet.com database on Apr. 6, 2022, 2 pages.
International Search Report for Application No. PCT/GB2019/051596, dated Sep. 11, 2019, 3 pages.
Computer-generated English language abstract for DE 10 2016 202 662 A1 extracted from espacenet.com database on Feb. 1, 2021, 2 pages.
English language abstract for JPS 61-122612 A extracted from espacenet.com database on Feb. 1, 2021, 1 page.
English language abstract for CN 107949792 A extracted from espacenet.com database on Jul. 1, 2022, 1 page.
Chinese Search Report for Application 2019800515193 dated Jun. 23, 2022, 1 page.

* cited by examiner

COMPOSITE SINGLE-MODE/MULTIMODE OPTICAL FIBER

CROSS-REFERENCE RELATED APPLICATION

This application is the National Stage of International Application No PCT/GB2019/051596, filed on Jun. 7, 2019, which claims priority to Great Britain Patent Application Serial No. 1810272.3, filed on Jun. 22, 2018, both of which are hereby incorporated by reference.

FIELD OF THE INVENTION

The present invention relates to optical fibers, in particular to multicore optical fibers for use in multiple sensing applications including optical sensing.

BACKGROUND TO THE INVENTION

In the early days of optical sensing in oil and gas wells, optical fiber was not specifically designed for its intended purpose and tended to fail in wells after only a short amount of time, often due to degradation of coatings on the fiber, or hydrogen-induced darkening of the fiber.

As a result of this, some companies used a technique to pump a fiber into an empty annealed control line that ran from the well head to the toe of the well. When the fiber failed, they could then pump out the bad fiber and install another fiber.

This worked to some extent in the early days of use of optical fibers in well applications, as the key parameter to measure was mainly temperature. As a result of the few desired sensing parameters, there was not much interest in inserting additional fibers.

Throughout the subsequent years, additional sensing technologies have been developed creating a need to deploy multiple fibers downhole (in a well). Some work has been attempted in this area but success has been extremely limited. To meet this need, pre-built cables within metal tubes with welded seams came onto the market to allow for enhanced sensing in the well. As these came into the market, and as enhanced oil recovery methods such as acid injection became more prevalent, it was found that in some combination of temperature and acid concentration that the welded seam along the outer metal tube would corrode quite rapidly due to the high levels of stress in the metal—this type of corrosion is called stress corrosion cracking and leads to degradation in the quality and usefulness of the cable.

One solution to this problem would be to install the fiber into an outer metal tube. However, due to the nature of the construction of such pre-built cables, for which outer metal tubes are welded and either drawn or roll reduced, it is not possible to have an annealed outer metal tube.

In the oil and gas industries, optical fibers are still used down wells to sense different physical parameters such as temperature, acoustics, pressure and strain. There are typically two methods of permanently placing a fiber in a well (downhole):

1) pumping a single optical fiber into an annealed control line, which is a metal tube that runs from the well head, down into the well, and usually has a return line that runs back from the bottom of the well. The fiber is usually pumped into place with fluids such as water or alcohol. This method allows for a relatively cheap and straightforward replacement of fibers, and does not typically require costly and time-consuming well workover of the well completion. The method also facilitates connection during installation as only hydraulic connections are needed until the final stage when the fiber is pumped. The downside of this methodology is that only one, or perhaps in some cases two fibers can be pumped successfully into the well. This limits the amount of sensing that can be performed, and to some extent also limits the potential accuracy of the sensing. Pumped fiber applications can tend to expose a fiber to over 180° C. oil and gas wells and so this can limit the use of fibers that suffer compromised operability at these temperatures; and 2) using a pre-built cable. In this method, multiple fibers can be built into a single pre-assembled cable, providing a full suite of sensing options due to the increased number of fibers. The disadvantages of this option include that it is not possible to replace the fibers without a costly well workover of the well completion. It also implies that optical fiber connections may be needed during installation that may be costly or not possible depending on the type of well completion used. Also, in making the cable, the outer metal tube of the cable is often work-hardened, which often creates handling issues—due to the increased stiffness—and also can increase the chances of corrosion in a high temperature, caustic well.

In some instances, it is desirable to perform more than one type of measurement at the same location and at the same time. For example, the combination of Distributed Acoustic Sensing (DAS) and Distributed Temperature Sensing (DTS) may be desirable. In the past, multiple fibers needed to be deployed and efforts made to collocate the fibers. This approach can, however, suffer difficulties caused by restricted space. Some deployment methods, such as pumping the fibers into tubes, may also be impractical with multiple fibers as discussed above. Another issue is that the fibers are separated, which may affect the quality of a measurement system. This can be seen, for example, if a temperature measurement of one fiber is used to compensate or correct the measurement of another fiber—a temperature difference between the two fibers may cause an error. This could be important when a parameter, such as temperature, varies with time. Also, the limitation on the number of ports on parts of the well completions, such as well heads, tubing hangers and packers (as known in the art), may impose a limitation on the number of fibers used.

Different optical fiber sensing systems use different types of fiber, some of which are more suitable for particular applications. For example, single mode (SM) fibers tend to be used for sensing systems based on Brillouin scattering, Rayleigh scattering, and fiber Bragg gratings (FBG), while multimode (MM) fibers tend to be used for sensing systems based on Raman scattering in order to capture more of the signal energy. Those systems have been used to measure different parameters, for example, Brillouin scattering used for distributed strain and temperature sensing (DSTS), Rayleigh scattering for distributed acoustic sensing (DAS), and Raman scattering used for distributed temperature sensing (DTS).

In some instances, it is desirable to perform more than one type of measurement at the same location and at the same time. For example, the combination of DAS and DTS may be desirable. As discussed, in order to perform more than one type of measurement, currently multiple fibers are needed to be deployed and efforts made to collocate the fibers.

It is therefore desirable to provide an efficient, reliable and cost-effective solution permitting sensing of multiple parameters at a single location simultaneously.

SUMMARY OF THE INVENTION

An optical fiber for incorporation into a sensing system, the optical fiber comprising: a single mode optical fiber core having a single mode optical fiber core diameter, a multimode optical fiber core having a multimode optical fiber core diameter, and an optical fiber cladding layer having a cladding layer diameter, the cladding layer surrounding the single mode optical fiber core and the multimode optical fiber core.

The multimode optical fiber core preferably comprises a refractive index profile, wherein the refractive index profile is preferably one selected from the range: graded index profile; step index profile; n graded index profile; w graded index profile.

The single mode optical fiber core, and the multimode optical fiber core, are preferably concentric.

Preferably the single mode optical fiber core diameter is not greater than the multimode optical fiber core diameter. Preferably the single mode optical fiber core diameter is a percentage of the multimode optical fiber core diameter, the percentage being one selected from the range: 0.1% to 99%.

In preferable embodiments, the single mode optical fiber core diameter is selected from the range of 1 μm to 25 μm. In preferable embodiments, the multimode optical fiber core diameter is selected from the range of 10 μm to 900 μm. The refractive index contrast, measuring the relative difference in refractive index of each of the single mode core and the multimode optical fiber core, or the relative difference in refractive index of each of the multimode optical fiber core and the cladding layer, may influence the respective diameters of each of the single mode optical fiber core, the multimode optical fiber core and/or the cladding layer.

Preferably the multimode optical fiber core diameter is a percentage of the cladding layer diameter, the percentage being selected from the range: 50% to 99%.

Preferably the single mode optical fiber core comprises a single mode optical fiber core numerical aperture, the single mode optical fiber core numerical aperture being selected from the range: 0.05 to 0.3.

Preferably the multimode optical fiber core comprises a multimode optical fiber core numerical aperture, the multimode optical fiber core numerical aperture being selected from the range: 0.1 to 0.5.

Preferably the optical fiber comprises a refractive index contrast determined from the single mode optical fiber core refractive index and the multimode optical fiber core refractive index. Preferably the refractive index contrast is specific to a desired application.

The required refractive index contrast and numerical aperture (NA) values for each of the single mode optical fiber core and the multimode optical fiber core may, in preferable embodiments, be defined in conjunction with the respective diameters of each of the single mode optical fiber core and the multimode optical fiber core to adapt to the requirements of a sensing system to be used. In an example embodiment, for instance, where Raman scattering based distributed temperature sensing is used, the multimode optical fiber core having a multimode optical fiber core diameter which is larger than would be required to be multimode with relatively large NA, such as, for example 0.15 to 0.3 and a relatively large multimode optical fiber core diameter, such as for example 30 μm to 100 μm. The single mode optical fiber core may be used for Rayleigh scattering, for distributed acoustic sensing (DAS), and it may be required to be largely single mode, for example with an NA of 0.1 to 0.18 and a relatively small single mode optical fiber core diameter, such as for example 3 μm to 20 μm (examples only).

In accordance with preferable embodiments of the present invention, an optical fiber is provided having a central, single mode, light-guiding core, a multimode light-guiding core concentric with the single mode optical fiber core and having a diameter greater than the single mode optical fiber core, and at least one cladding layer. Embodiments will be appreciated wherein the optical fiber comprises a plurality of single mode optical fiber cores and/or a plurality of multimode optical fiber cores. In preferable embodiments the cladding layer does not act as a waveguide, but embodiments will be appreciated comprising at least one cladding layer wherein the at least one cladding layer performs a waveguide function. In preferable embodiments, the single mode optical fiber core and the multimode optical fiber core perform a sensing function. Preferably the single mode optical fiber core and the multimode optical fiber core perform different sensing functions. Embodiments will be appreciated wherein the single mode optical fiber core and the multimode optical fiber core perform the same sensing function. In the context of the present invention, "different sensing functions" will be understood by the skilled reader to mean sensing of different parameters, and the "same sensing function" will be understood to mean sensing of substantially the same parameter or parameters.

Examples of "parameters" to be sensed include, but are not limited to, temperature, pressure, electrical field, magnetic field, radiation, seismic activity, vibration, acoustics, stress, strain, stretch, shear force, deformation, shape, displacement, velocity, acceleration, longitudinal force, composition of materials, concentration of materials. Embodiments will be appreciated wherein the "parameters" to be sensed are any parameters suitable for sensing using optical fibers. In accordance with preferable embodiments, an optical fiber is provided having multiple sensing capabilities, wherein said multiple sensing may preferably be performed at a single location and at a single time. Applications requiring, for example, downhole sensing of multiple parameters typically use multiple fibers. Space restrictions often make the use of multiple fibers impractical, and the use of multiple fibers to synchronise measurements from a single location at a single time can cause issues since the sensors (the optical fiber cores) are not co-located or in the same fiber body.

Concentric cores preferably aids in the splicing of optical fibers according to preferable embodiments of the present invention, wherein embodiments comprising non-concentric cores may be more difficult to splice due to alignment and orientation issues.

The use of concentric cores preferably facilitates splicing and/or connection between two fibers and their respective cores, preferably because alignment can be determined from the outside of the fiber, which preferably automatically provides interior alignment of all of the respective cores within each of the fibers simultaneously. This can preferably be a significant advantage when desired connections between fibers are remote or otherwise difficult to perform, such as in an oil/gas well or placed subsea.

Preferably the optical fiber further comprises an outer protective coating layer. Preferably the coating layer surrounds a cladding layer and preferably does not perform a waveguide function.

Preferably the coating layer comprises at least one selected from the range: acrylate; carbon; high temperature acrylate; silicone; PFA; polyimide; carbon; metal; radiation-cured coating materials including but not restricted to epoxy-acrylates, urethane-acrylates, silicone rubbers (including rtv silicones), polyimides and epoxies, electrostrictive material, magnetostrictive material, piezoelectric material, polymeric material.

In some preferable embodiments, the coating layer comprises a material having a lower refractive index than an outermost core of the optical fiber. Further in such embodiments, the coating layer may comprise one or more dopants used to either raise or lower the refractive index of the coating layer, or to otherwise adjust the properties of the coating layer to be suitable for a desired application.

The term coating layer will be understood by the skilled addressee to mean a layer surrounding the optical fiber, which may include a multicore fiber with or without a cladding layer. It will be appreciated that optical fiber cores are typically light-guiding, and that optical fiber cladding layers can be light-guiding. It will be further appreciated that coating layers in the context of the present invention may or may not be light-guiding.

Preferably the polymeric material comprises resin and wherein the resin is arranged to be modified such that the polymeric material exhibits functional properties, the functional properties selected from the range of electrostrictive, magnetostrictive, polarisation sensitive, piezo-electric properties.

More preferably the polymeric material resin is arranged to be modified with predetermined, selected monomers or free radicals introduced in a fiber draw polymerisation process.

Preferably the single mode optical fiber core, and/or the multimode optical fiber core comprise at least one optical fiber dopant selected from the range: Al; Er; Se; F; Cl; Br; Ge; P; Yb; polymer.

The optical fiber cladding layer preferably comprises at least one optical fiber dopant selected from the range: Al; Er; Se; F; Cl; Br; Ge; P; Yb; polymer.

In the context of the present invention, the term "optical fiber dopant" will be understood by the skilled addressee to mean a dopant used to alter the properties of an optical fiber core, cladding layer and/or coating layer. Such properties may, for example, include the structural properties, refractive index, expansion coefficient, temperature coefficient, stress inducing properties, waveguide properties, amplification properties, stability, reactivity, resistance to degradation in structure, resistance to darkening, resistance to degradation in quality, among others. Such properties as have not been discussed here will be well known to one skilled in the art of optical fiber manufacture. The optical fiber dopants discussed will be understood to be used in elemental form, ionic form, or compound form comprising additional elements not listed.

In the optical fiber according to the first aspect of the present invention, doping materials can preferably be used to adjust the index of refraction (or refractive index) of one or more of: the single mode optical fiber core, the multimode optical fiber core, the optical fiber cladding layer. These different doping materials may preferably be used to enhance the performance of the optical fiber for one or more of a wide variety of applications.

Doping strategies may be used in the present invention to reduce hydrogen-induced darkening, which may include doping the optical fiber cores and/or cladding layer with chlorine in the absence of oxygen and water.

In some preferable embodiments, the single mode optical fiber core may comprise an optical grating. In some preferable embodiments, the multimode optical fiber core may comprise an optical grating. Embodiments will be appreciated wherein either the single mode optical fiber core or the multimode optical fiber core comprises an optical grating. Further embodiments will be appreciated wherein both the single mode optical fiber core and the multimode optical fiber core comprise an optical grating. Additional embodiments will be appreciated wherein all of the optical fiber cores in the optical fiber comprise an optical grating. Embodiments will also be appreciated wherein neither the single mode optical fiber core nor the multimode optical fiber core comprise an optical grating.

Preferably the optical fiber dopant increases or decreases a photosensitivity of at least one entity within the group:
  the single mode optical fiber core;
  the multimode optical fiber core;
  the cladding layer;
when compared with pre-doped equivalents of said entities; wherein writing of an optical grating to one entity of said group does not significantly affect the waveguide properties of the other entities of said group.

The term "pre-doped equivalents of said entities" will be understood by the skilled addressee to mean the entities of the group comprising the single mode optical fiber core, the multimode optical fiber core, and the cladding layer, which have not received said optical fiber dopant or received it in smaller concentration not intended to alter the photosensitivity. Embodiments will be appreciated wherein the "pre-doped equivalents of said entities" will refer to entities comprising optical fiber dopants, but which have not received the specific dopant which was used to increase or decrease the photosensitivity of said entity. Preferably increasing the photosensitivity of said entities increases the ease with which an optical grating may be written on said entities.

Different doping strategies, comprising the use of one or more optical fiber dopants, can preferably be used to allow the writing of optical gratings, such as Fiber Bragg Gratings into the single mode optical fiber core, without affecting the multimode optical fiber core. Fiber Bragg Gratings (FBG) can be written on optical fiber cores using UV radiation. Germanium doping, for example, increases the photosensitivity of the core and allows for easier or stronger FBG writing. In a possible embodiment comprising concentric cores, an inner core, which may preferably be the single mode optical fiber core, may be doped with germanium to allow the writing of FBGs, while an outer core, which may preferably be the multimode optical fiber core, may be germanium free or have low germanium concentration to minimize the FBG writing sensitivity. The doping strategy described could, in other embodiments, be alternated to achieve an alternate effect. In a possible embodiment, the single mode optical fiber core could be doped with a high photosensitivity dopant, like for example germanium, while the multimode optical fiber core could be doped with a low photosensitivity dopant, like for example fluorine.

Additional embodiments will be appreciated wherein the optical grating is any suitable optical grating for use in an optical fiber. Further additional embodiments will be understood, wherein the optical grating is present within the multimode optical fiber core, and optionally wherein a doping strategy is used such that the placement of an optical grating in the multimode optical fiber core does not affect properties, such as waveguide properties, of the single mode optical fiber core. Embodiments will be appreciated wherein the single mode optical fiber core and the multimode optical fiber core each comprise optical gratings, optionally wherein a doping strategy is used to reduce or prevent one of the single mode optical fiber core or the multimode optical fiber core from affecting the other.

In accordance with a second aspect of the present invention, there is provided a sensing system comprising an optical fiber, the optical fiber comprising: a single mode optical fiber core, a multimode optical fiber core, and an optical fiber cladding layer surrounding the single mode optical fiber core and the multimode optical fiber core.

Preferably the optical fiber of the sensing system of the second aspect of the present invention is an optical fiber according to the first aspect of the present invention.

Preferably the sensing system is arranged to perform a plurality of sensing techniques, the sensing techniques being selected from the range: Rayleigh scattering; Brillouin Scattering; Raman scattering; Fiber Bragg Gratings; interferometry; Distributed Acoustic Sensing (DAS); Distributed Temperature Sensing (DTS); Distributed Strain and Temperature Sensing (DSTS).

Preferably the sensing system is arranged to sense a plurality of parameters, the parameters selected from the range: temperature, pressure, electrical field, magnetic field, radiation, seismic activity, vibration, acoustics, stress, strain, stretch, shear force, deformation, shape, displacement, velocity, acceleration, longitudinal force, composition of materials, concentration of materials.

Preferably the sensing system is arranged to sense the plurality of parameters at the same location and/or at the same time. Preferably the same location refers to the same optical fiber cross section. Preferably a first parameter sensed at said location is used to alter the interpretation of a second parameter sensed at said location. Preferably the first parameter sensed at said location is used to compensate, validate, and/or calibrate a second variable sensed at said location.

Preferably the sensing system further comprises at least one input portion arranged to provide an optical signal and accept an optical signal; and at least one detector portion arranged to accept an output optical signal.

In a preferred embodiment of the second aspect of the present invention, the input portion is an optical fiber sensor instrumentation (OFSI). This may be used to interrogate the one or more of the single mode optical fiber core, the multimode optical fiber core and the cladding of the optical fiber. The OFSI can have the function of sending and receiving the optical signal so that it can be detected and transformed into useful information.

Preferably the sensing system is arranged to be used in an application selected from the range: oil industry; gas industry; structural monitoring; pipeline monitoring.

Distributed acoustic sensing (DAS) or distributed vibration sensing (DVS) normally uses Rayleigh scattering and is used in a preferred embodiment of the present invention. A possible advantage of this system may preferably be that the whole length of the fiber can be used as a sensor. As such it can sense thousands of meters of fiber and it is configurable at the DAS/DVS instrumentation at one end of the fiber. It normally works by sending one or more pulses of light, preferably within the infrared spectrum, into an optical fiber. Some of the light being scattered by the material of the fiber is directed backwards toward the sensing system. The time the signal takes to return to the DAS/DVS system provides the information on the distance in the fiber where scattering of signal is occurring. The properties of the signal, such as its phase, may potentially be used to infer vibration, strain or temperature, among other things. A DAS system can preferably be configured to simulate thousands of sensors along the fiber.

A model or algorithm can optionally be used to assist the interpretation of the signals. It can preferably use known properties or predict behaviour of what is inside a system to be sensed and to combine with the signals detected to provide better measurements. The modelling can preferably be assisted by finite element analysis (FEA) techniques and/or analytical or parametric models. Artificial intelligence (AI) techniques can preferably also be used in order to allow the system to "learn" from experience.

The use of models, algorithms and/or calibration can preferably allow the system to distinguish or separate the effects of vibrations or signals from the system being sensed, the environment and/or any other signals. This can be very valuable as effects such as electrical system or cable resonances, as well as noise from a surrounding area, can potentially have a detrimental effect on the quality of a measurement undertaken by the sensing system.

In a preferred embodiment of the sensing system according to the second aspect of the present invention, the sensing system is preferably used to detect a plurality of parameters which may comprise, but are not limited to: temperature, pressure, electrical field, magnetic field, radiation, seismic activity, vibration, acoustics, stress, strain, stretch, shear force, longitudinal force, composition of materials, concentration of materials.

The present invention preferably enables the measurement of multiple parameters, which may, for example, include temperature, strain and/or vibration, using interrogation techniques. The multiple parameters may, for example, include temperature, strain, vibration and/or any other parameter suitable for measurement using an optical fiber such as that provided by the first aspect of the present invention, or a sensing system such as that provided by the second aspect of the present invention. The interrogation techniques may, for example, include, Rayleigh scattering, Brillouin Scattering, Raman scattering, Fiber Bragg Gratings, interferometers, and/or any other technique suitable for use with an optical fiber such as that provided by the first aspect of the present invention, or a sensing system such as that provided by the second aspect of the present invention. The interrogation techniques may preferably typically require different fiber types, which may include fibers having multiple functions, such as for example, a single mode, a multimode and/or different numerical apertures (NA). The present invention preferably provides the desired functionality in such interrogation techniques using a single fiber, which preferably enables cross calibration or compensation, preferably minimising the number of fibers and more preferably facilitating connections and splices.

In accordance with a third aspect of the present invention, there is provided a method of manufacturing an optical fiber by carrying out one or more chemical vapour deposition reactions in a substrate, the method comprising the steps of:
i) providing a plurality of optical fiber substrate preform with glass forming precursors;
ii) generating a reaction in the substrate to form an amorphous glass layer on the substrate;
iii) depositing a layer of unsintered soot comprising SiO2;
iv) sintering the glass layer;
v) repeating the process while adding dopants at given concentrations when required; and
vi) drawing an optical fiber from the preform formed in step vi) with the application of heat and tension and providing an optical fiber coating.

Preferably the optical fiber manufactured using the method according to the third aspect of the present invention is an optical fiber according to the first aspect of the present invention.

In accordance with a fourth aspect of the present invention, there is provided a method of sensing, the method comprising the steps of:
i) providing an optical fiber comprising:
a single mode optical fiber core,
a multimode optical fiber core, and
an optical fiber cladding layer surrounding the single mode optical fiber core and the multimode optical fiber core; and
ii) using said optical fiber for sensing a plurality of parameters.

The term "parameters" will be understood by the skilled reader, in the context of the present invention to refer to parameters suitable for sensing using an optical fiber.

Preferably at least one of said parameters is a single mode parameter and is sensed by the single mode optical fiber core; and wherein at least one of said parameters is a multimode parameter and is sensed by the multimode optical fiber core.

It will be understood by the skilled addressee that the term "single mode parameter", in the context of the present invention, is intended to mean a parameter sensed by a single mode optical fiber core. It will be further understood then, that the term "multimode parameter" is intended to mean a parameter sensed by the multimode optical fiber core of an optical fiber. The single mode parameter may preferably be a parameter which is optimally sensed by a single mode optical fiber core and the multimode parameter may preferably be a parameter which is optimally sensed by a multimode optical fiber core.

The single mode parameter and the multimode parameter are preferably different to one another.

In accordance with preferable embodiments of the method according to the fourth aspect of the present invention, the sensing is preferably performed at substantially the same location. The sensing is further preferably performed at substantially the same time.

The optical fiber of the present invention preferably enables multiple sensing and/or measurements to be performed at the same location and at the same time.

The ability to provide different measurements and/or sensing using a single optical fiber preferably allows for measuring and/or sensing multiple parameters at the same optical fiber cross section, which preferably refers to the same location on the optical fiber. This preferably allows for the information from one sensing and/or measurement to be used to affect the interpretation of another measurement and/or sensing performed at the same location/optical fiber cross section. Said affecting of interpretation may, for example, comprise a compensation, validation or calibration of said other measurement and/or sensing performed at the same location/optical fiber cross section. For example, a Distributed Temperature Sensing (DTS) measurement and/or sensing could be used to compensate for temperature variations for a distributed strain and temperature sensing (DSTS) strain measurement.

In the past multiple fibers have been used for measuring and/or sensing multiple parameters. It can be very difficult to ensure that two or more fibers would experience the same environment simultaneously, and therefore that the information provided by said fibers would accurately depict said same environment at a chosen time. For example, even when two fibers are placed in the same cable, they may experience differing stresses when the cable is moved, deformed or is subject to a temperature variation having an origin. Having multiple measurements made within the same fiber clad, such as with the present invention, preferably resolves error associated with the use of multiple fibers. Having said measurements and/or sensing performed using concentric cores, such as with the present invention, would preferably further minimize the errors described.

The plurality of parameters are preferably selected from the range: temperature, pressure, electrical field, magnetic field, radiation, seismic activity, vibration, acoustics, stress, strain, stretch, shear force, deformation, shape, displacement, velocity, acceleration, longitudinal force, composition of materials, concentration of materials.

Embodiments will be appreciated wherein the parameters are any parameters suitable for sensing using an optical fiber.

Preferably at least one of said sensed multiple parameters is used to affect the interpretation of at least one other of said sensed multiple parameters.

Preferably said affecting the interpretation comprises at least one selected from the range: calibration; compensation; validation; correction; background correction; noise removal; normalisation; polishing; artefact removal; pattern recognition. In some cases the same type of measurement may be made using two different cores, each measurement having different resolution that could be used in different ways. For example, one measurement may have high measurand (such a temperature) resolution and low space resolution (length of fibre over which the measurement is taken), while the other measurement may present the opposite, low measurand resolution and high space resolution. This could be used to identify different types of events.

Preferably the optical fiber provided in step i) of the method according to the fourth aspect of the present invention is an optical fiber in accordance with the first aspect of the present invention. Preferably the optical fiber in step i) of the method of sensing according to the fourth aspect of the present invention is provided using the method of manufacture of the third aspect of the present invention. Preferably the optical fiber in step i) of the method of sensing according to the fourth aspect of the present invention is comprised within a sensing system according to the second aspect of the present invention.

In accordance with a fifth aspect of the present invention, there is provided a use of a single optical fiber within an annealed control line for downhole sensing; wherein the optical fiber comprises: a single mode optical fiber core, a multimode optical fiber core, and an optical fiber cladding layer surrounding the single mode optical fiber core and the multimode optical fiber core. Preferably the use comprises detecting a plurality of parameters. Preferably the optical fiber is an optical fiber according to the first aspect of the present invention.

DETAILED DESCRIPTION

Specific embodiments will now be described by way of example only, and with reference to the accompanying drawings, in which.

Figure 1A:
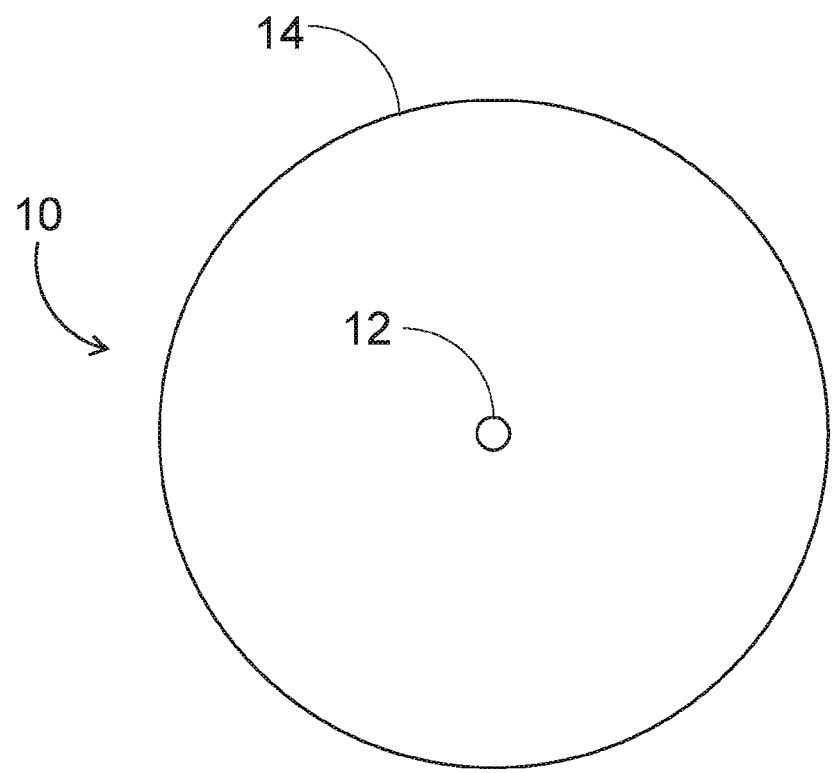
FIG. 1A shows a sectional view of a single mode optical fiber in accordance with currently available technology.
Figure 1B:
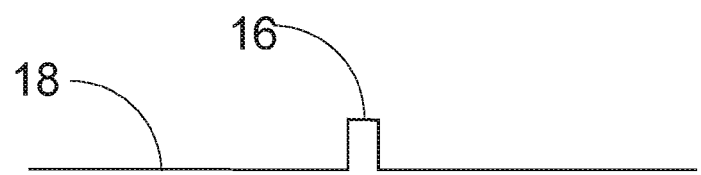
FIG. 1B shows a refractive index profile of the single mode fiber of FIG. 1A.

Referring to FIG. 1A, there is provided a sectional view of a cylindrical single mode optical fiber 10, comprising a single mode optical fiber core 12 and an optical fiber cladding layer 14. The single mode optical fiber core 12 is shown to have a core diameter of roughly 5% of the diameter of the cladding layer 14. The refractive index profile for the fiber shown in FIG. 1A is shown in FIG. 1B, wherein the single mode optical fiber core region 16, corresponding to the single mode optical fiber core 12 exhibits an increased refractive index when compared with the surrounding cladding layer region 18, corresponding to the cladding layer 14. The increase in the index of the core, in the example shown, is brought about using dopants during the manufacture of said fiber, wherein the optical fiber core is doped with index-raising dopants, such as germanium. Other examples exist, exhibiting a similar index profile, wherein the surrounding cladding layer is doped with index-lowering dopants, such, for example, fluorine.

Figure 2A:
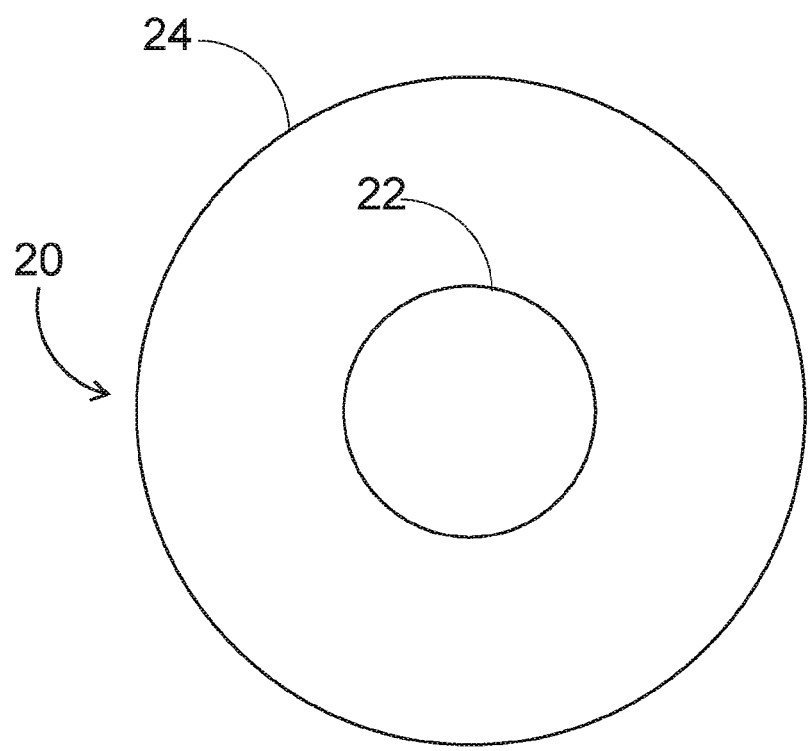
FIG. 2A shows a sectional view of a multimode optical fiber in accordance with currently available technology.
Figure 2B:
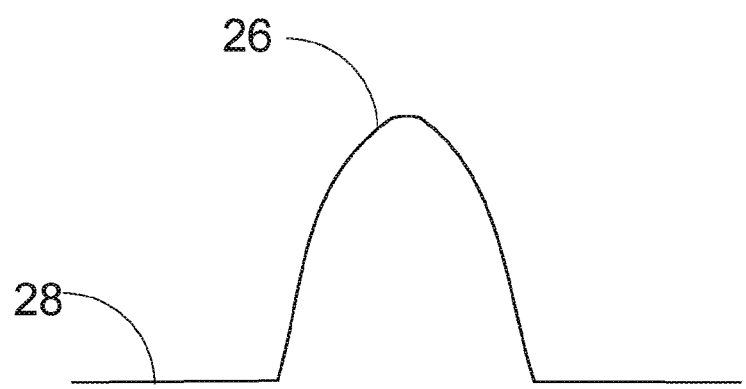
FIG. 2B shows a refractive index profile of the multimode fiber of FIG. 2A.

A sectional view of an example of a multimode optical fiber 20 is shown in FIG. 2A, wherein the multimode optical fiber 20 comprises a multimode optical fiber core 22 and a surrounding cladding layer 24. The refractive index profile for the fiber 20 shown in FIG. 2A is shown in FIG. 2B, wherein the multimode optical fiber core region 26, corresponding to the multimode optical fiber core 22 exhibits an increased refractive index when compared with the surrounding cladding layer region 28, corresponding to the cladding layer 24. The multimode optical fiber core 22 of FIG. 2A is shown in the corresponding portion 26 of FIG. 2B to have a graded index profile. As with the single mode fiber 10 shown in FIG. 1A, dopants may be used to reduce the refractive index of the cladding layer 24, or raise the refractive index of the light-guiding optical fiber core 22.

Figure 3A:
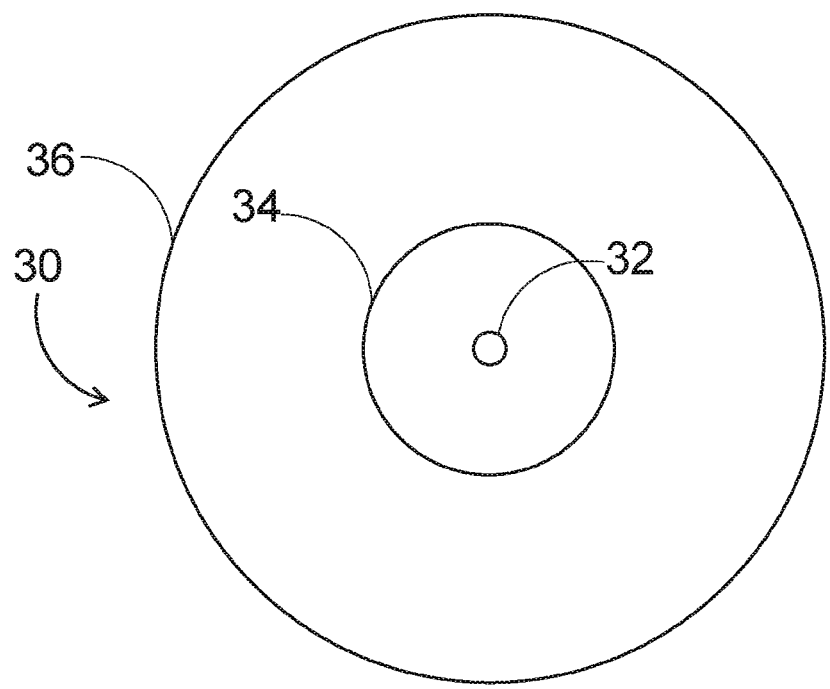
FIG. 3A shows a sectional view of an example embodiment of an optical fiber according to the first aspect of the present invention.
Figure 3B:
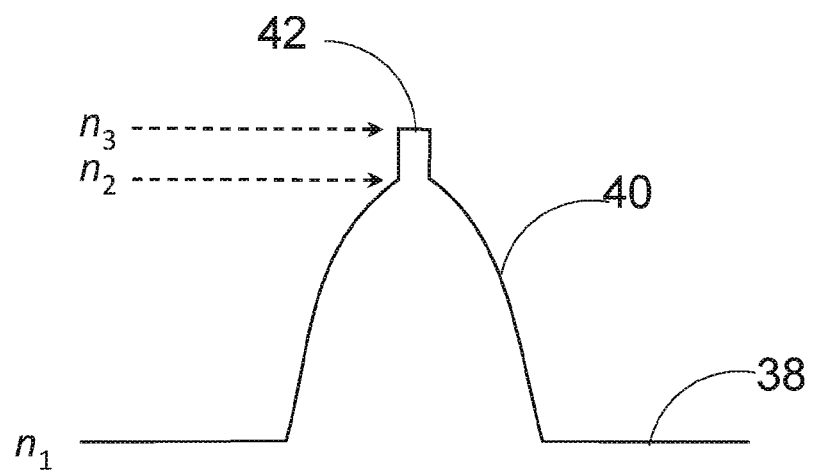
FIG. 3B shows a refractive index profile of the optical fiber of FIG. 3A.

An example embodiment of an optical fiber 30 according to the present invention is shown in FIG. 3A, wherein the optical fiber 30 comprises a single mode optical fiber core 32, a multimode optical fiber core 34 concentric with the single mode optical fiber core 32, and a surrounding cladding layer 36. As can be seen from FIG. 3A, the multimode optical fiber core 34 comprises a multimode optical fiber core diameter that is larger than the single mode optical fiber core diameter. The cladding layer 36 comprises a cladding layer diameter that is larger than the multimode optical fiber core diameter. FIG. 3B shows the refractive index profile of the example embodiment 30 shown in FIG. 3A, with a cladding layer region 38 representing the relative refractive index of the cladding layer 36; a multimode optical fiber core region 40 representing the relative refractive index of the multimode optical fiber core 34, and a single mode optical fiber core region 42 representing the relative refractive index of the single mode optical fiber core 32, each shown relative to each other. As can be seen, the multimode optical fiber core 34 in the embodiment shown 30 has a graded index profile 40.

FIG. 3A shows an example optical fiber of the first aspect for use in a sensing system according to the second aspect, the optical fiber comprising more than one core, wherein the sensing system required varied sensing methods to be used. The refractive index profile for the example embodiment shown in FIG. 3A is shown in FIG. 3B.

In the example shown 30, manufactured using a method according to the third aspect of the present invention, doping materials have been used in the manufacture of the single mode optical fiber core, the multimode optical fiber core and the cladding layer. The doping materials have been used in order to enhance the performance of the optical fiber 30 for a given application.

In the example embodiment 30 shown, the refractive index level at $n_2$ is that of pure silica glass; the refractive index level $n_1$ corresponds to silica doped with an index lowering agent, fluorine, which is used for exemplification purposes only and other index lowering agents will be appreciated. Other index lowering agents comprise, for example, Boron. The refractive index level $n_3$ corresponds to silica doped with an index raising agent, germanium, used again for exemplification purposes only. Other index raising agents comprise, for example, Aluminium and Phosphorus, and other index raising agents will be appreciated. The refractive index profile shown in FIG. 3B preferably permits the writing of Fiber Bragg Gratings in the single mode optical fiber core 32 without significantly affecting the waveguide properties of the multimode optical fiber core 34.

Embodiments will be appreciated wherein the refractive index profile shown in FIG. 3B represents a different range of refractive indices, wherein for example the refractive index level $n_3$ is related to pure silica, and the levels $n_2$ and $n_1$ each correspond to silica doped with index raising agent, fluorine or chlorine, at different levels. Such a configuration is preferably useful in applications where hydrogen resistance, or radiation resistance, is desirable.

It is a preferable part of the invention that the index of refraction (refractive index) of the profile can be adjusted by the use of different doping strategies or materials in order to enhance performance for a given application. One example case, using FIG. 3B as a guide, is where the level $n_2$ is related to pure silica, the level $n_1$ corresponds to doped silica, possibly with fluorine doping, and the level $n_3$ corresponds to doped silica, possibly germanium doping. This configuration could be useful to allow the writing of Fiber Bragg Gratings in the single mode optical fiber core without affecting the multimode optical fiber core.

Another of those example cases is where the level $n_3$ is related to pure silica, the levels $n_2$ and $n_1$ correspond to doped silica, possibly with fluorine doping, with different levels of doping. This configuration could be useful in applications where hydrogen- or radiation-resistance is desirable.

Another example embodiment (not shown) would include a fiber similar to that shown in FIG. 3A, but wherein the index $n_1$ is that of pure silica glass, and $n_2$ and $n_3$ are achieved by up-doping (increasing the refractive index of) the glass with dopants, which may for example include germanium.

The concentric cores of the example 30 shown is preferably beneficial for splicing of the fiber 30, and more convenient alignment of the corresponding single mode optical fiber core 32, multimode optical fiber core 34 and cladding layer 36.

In an additional example embodiment (not shown) an optical fiber according to the first aspect may be coated with a coating material that is normally selected depending on the application and the conditions in which the fiber will be used. For example, fibers that are expected to withstand high temperatures may be coated with a high temperature polymer such as polyimide. A carbon layer deposited on the cladding could optionally be used to improve hermeticity or increase fatigue resistance.

Figure 4A:
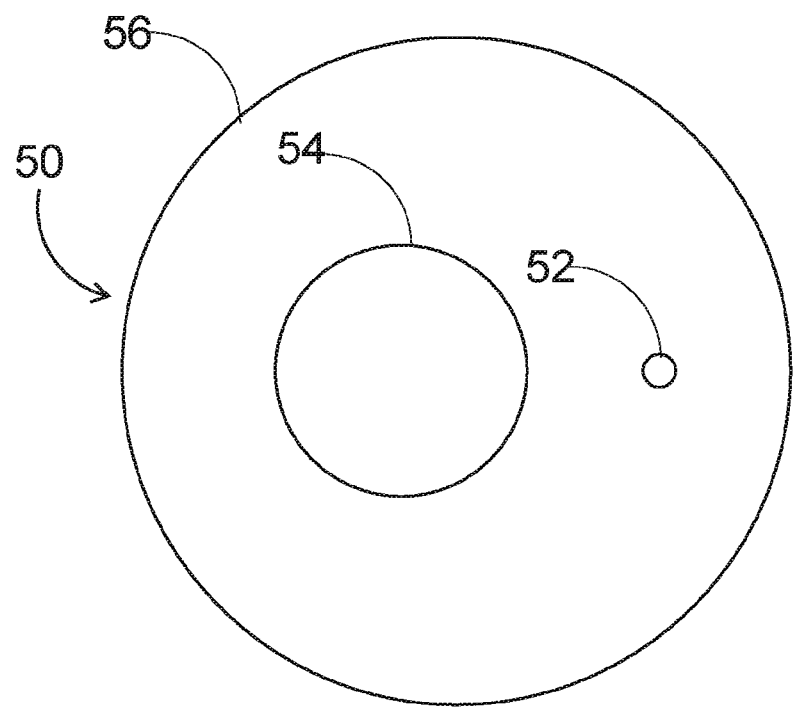
FIG. 4A shows a sectional view of an additional example embodiment of an optical fiber according to the first aspect of the present invention.
Figure 4B:
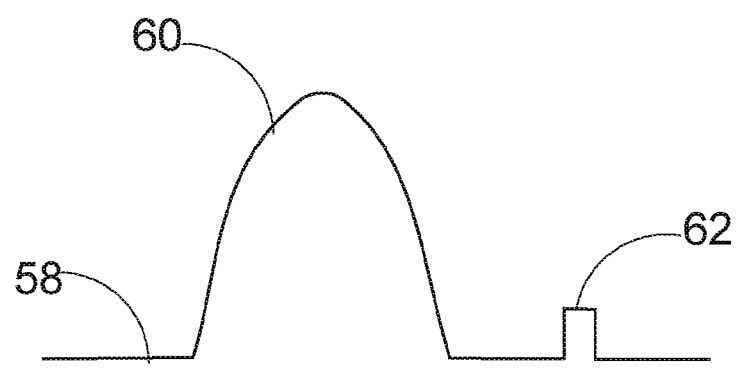
FIG. 4B shows a refractive index profile of the optical fiber of FIG. 4A.

FIG. 4A provides a further example embodiment 50 of an optical fiber according to the first aspect of the present invention, the example embodiment 50 have a single mode optical fiber core 52, a multimode optical fiber core 54 aligned with the single mode optical fiber core 52, and a cladding layer 56 surrounding the single mode optical fiber core 52 and the multimode optical fiber core 54. A refractive index profile of the example embodiment 50 is shown in FIG. 4B, comprising a cladding layer region 58 corresponding to the cladding layer 36, a multimode optical fiber core region 60 corresponding to the multimode optical fiber core 54, and a single mode optical fiber core region 62 corresponding to the single mode optical fiber core 52. The refractive index of each of the single mode optical fiber core 52 and the multimode optical fiber core 54 are shown in FIG. 4B to be raised relative to the refractive index of the cladding layer 36. Examples of acceptable index-raising doping strategies have been described for FIG. 3A and FIG. 3B above.

Figure 5:
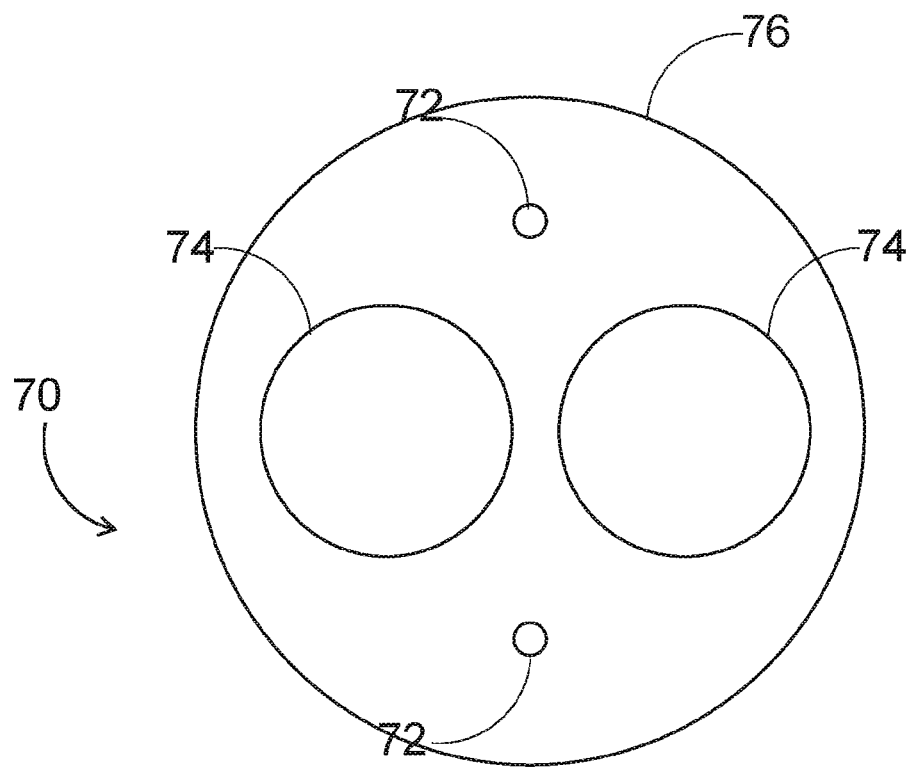
FIG. 5 shows a sectional view of an additional embodiment of an optical fiber according to the first aspect of the present invention, for use in a sensing system according to the second aspect of the present invention.

A further example embodiment 70 of an optical fiber according to the first aspect of the present invention is shown in FIG. 5, the optical fiber 70 comprising two aligned single mode optical fiber cores 72, and two aligned multimode optical fiber cores 74, all surrounded by a cladding layer 76. The two single mode optical fiber cores may be aligned in a axis and the two multimode optical fiber cores may be aligned in another axis wherein those two axes may be orthogonal. Example refractive index profiles and doping strategies for the single mode optical fiber cores 72 and the multimode optical fiber cores 74 relative to the cladding layer 76 have been described above for FIG. 3A, FIG. 3B, FIG. 4A, and FIG. 4B.

In use the optical fiber of any one of FIG. 3A, FIG. 4A or FIG. 5 is incorporated into a sensing system and used to perform more than one type of measurement at the same location and at the same time within a downhole sensing application within the oil industry. The fiber comprises a plurality of sensors within a single fiber and therefore permits pumping of only a single optical fiber down a control line for the purpose of performing multiple sensing at the same location and at the same time. As such, effective detection and location of anomalies in a downhole system are preferably permitted. The single mode optical fiber core(s) in each example comprises fiber Bragg gratings or vibration sensing using Distributed Acoustic Sensing (DAS). The multimode optical fiber core(s) in each embodiment are instead optimised for sensing temperature, using Distributed Temperature Sensing (DTS).

In the past, multiple fibers needed to be deployed and efforts made to collocate the fibers. This less effective approach can, however, suffer difficulties caused by restricted space.

Some deployment methods, such as pumping the fibers into control lines, may also be impractical with multiple fibers. Another issue is that the fibers are separated, which may affect the quality of a measurement system where precise collocation of measurements is required for effective anomaly detection. This can be seen, for example, if a temperature measurement of one fiber is used to compensate or correct the measurement of another fiber—a temperature difference between the two fibers may cause an error. This could be important when a parameter, such as temperature, varies with time.

Each of the above-described example embodiments of the first aspect of the present invention are suitable for incorporation into a sensing system according to the second aspect of the present invention. An example embodiment of a sensing system according to the second aspect further comprises at least one input portion arranged to provide an optical signal and accept an optical signal; and at least one detector portion arranged to accept an output optical signal.

Figure 6:
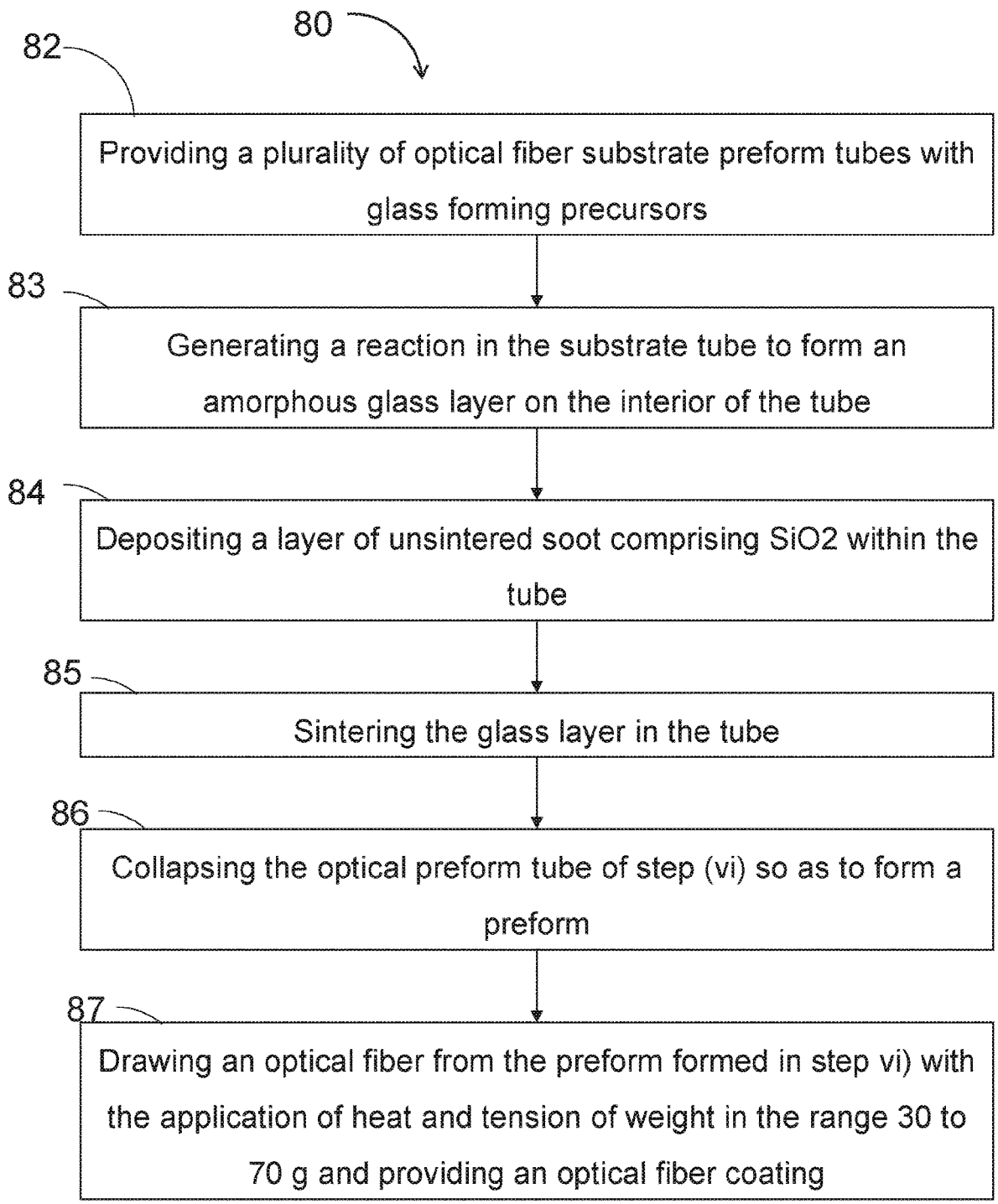
FIG. 6 shows a flow chart of steps of an example embodiment of a method of manufacture according to the third aspect of the present invention.

An example embodiment of a method 80 of manufacture according to the third aspect of the present invention is shown in FIG. 6, the method being one of carrying out one or more chemical vapour deposition reactions in a substrate tube, and the method comprising the steps of:
i) providing a plurality of optical fiber substrate preform with glass forming precursors;
ii) generating a reaction in the substrate to form an amorphous glass layer on the substrate;
iii) depositing a layer of unsintered soot comprising SiO2;
iv) sintering the glass layer;
v) repeating the process while adding dopants at given concentrations when required; and
vi) drawing an optical fiber from the preform formed in step vi) with the application of heat and tension and providing an optical fiber coating.

The example method shown in FIG. 6 is suitable for the production of any of the example embodiments of optical fibers according to the first aspect of the present invention described above.

Figure 7:
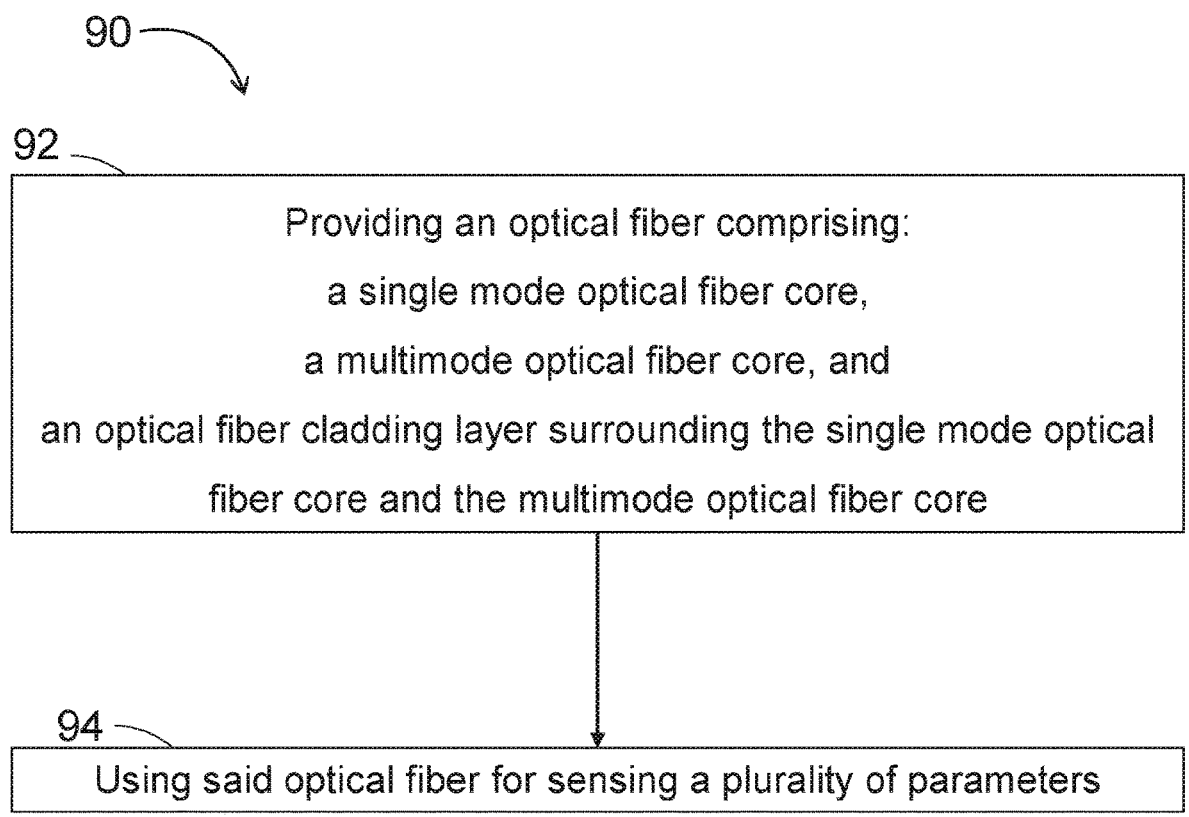
FIG. 7 shows a flow chart of steps of an example embodiment of a method of sensing according to the fourth aspect of the present invention.

An example embodiment of a method 90 of sensing according to the fourth aspect of the present invention is shown in FIG. 7, the method comprising the steps of:
i) providing an optical fiber comprising:
a single mode optical fiber core,
a multimode optical fiber core, and
an optical fiber cladding layer surrounding the single mode optical fiber core and the multimode optical fiber core 92; and
ii) using said optical fiber for sensing a plurality of parameters 94.

It will be appreciated that the above described embodiments are given by way of example only and that various modifications thereto may be made without departing from the scope of the invention as defined in the appended claims.

The invention claimed is:

1. An optical fiber for incorporation into a sensing system to perform more than one type of measurement at a same time, the optical fiber comprising:
a single mode optical fiber core having a single mode optical fiber core diameter of from 3 μm to 20 μm and a numerical aperture of from 0.1 to 0.18, said single mode optical fiber core being provided as a sensor for sensing a single mode parameter using a Rayleigh scattering technique,
a multimode optical fiber core having a multimode optical fiber core diameter of from 30 μm to 100 μm and a numerical aperture of from 0.15 to 0.3, said multimode optical fiber core being provided as a sensor for sensing a multimode parameter different than said single mode parameter using a Raman scattering technique, and an optical fiber cladding layer having a cladding layer diameter, the cladding layer surrounding the single mode optical fiber core and the multimode optical fiber core.

2. An optical fiber as claimed in claim 1, wherein the multimode optical fiber core comprises a refractive index profile, further wherein the refractive index profile is one selected from the range: graded index profile; step index profile; n graded index profile; w graded index profile.

3. An optical fiber as claimed in claim 1, wherein the single mode optical fiber core, and the multimode optical fiber core, are concentric.

4. An optical fiber as claimed in claim 3, wherein the single mode optical fiber core diameter is a percentage of the multimode optical fiber core diameter, the percentage being one selected from the range: 0.1% to 99%.

5. An optical fiber as claimed in claim 4, wherein the multimode optical fiber core diameter is a percentage of the cladding layer diameter, the percentage being selected from the range: 50% to 99%.

6. An optical fiber as claimed in claim 1, wherein the optical fiber further comprises an outer protective coating layer.

7. An optical fiber as claimed in claim 6, wherein the coating layer comprises at least one selected from the range: acrylate; carbon; high temperature acrylate; silicone; PFA; polyimide; carbon; metal; electrostrictive materials; magnetostrictive materials; piezoelectric materials; polymeric materials; and radiation-cured coating materials, wherein the radiation-cured coating materials are selected from the range of: epoxy-acrylates, urethane-acrylates, silicone rubbers, polyimides and epoxies.

8. An optical fiber as claimed in claim 1, wherein the single mode optical fiber core, and/or the multimode optical fiber core, and/or the cladding layer comprise at least one optical fiber dopant selected from the range: Al; Er; Se; F; Cl; Br; Ge; P; Yb; polymer.

9. An optical fiber as claimed in claim 8, wherein the optical fiber dopant increases or decreases a photosensitivity of at least one entity within the group:
the single mode optical fiber core;
the multimode optical fiber core;
the cladding layer;
when compared with pre-doped equivalents of said entities; wherein writing of an optical grating to one entity of said group does not affect the waveguide properties of the other entities of said group.

10. A sensing system comprising an optical fiber, the optical fiber comprising:
a single mode optical fiber core having a diameter of from 3 µm to 20 µm and a numerical aperture of from 0.1 to 0.18, a multimode optical fiber core diameter of from 30 µm to 100 µm and a numerical aperture of from 0.15 to 0.3, and an optical fiber cladding layer surrounding the single mode optical fiber core and the multimode optical fiber core;

wherein the single mode optical fiber core measures vibration using a Rayleigh scattering technique and the multimode optical fiber core measures temperature using a Raman scattering technique at a same time with the optical fiber.

11. A sensing system as claimed in claim 10, wherein the sensing system is arranged to be used in an application selected from the range: oil industry; gas industry; structural monitoring; pipeline monitoring.

12. A sensing system as claimed in claim 10, wherein the multimode optical fiber core comprises a refractive index profile, further wherein the refractive index profile is one selected from the range: graded index profile; step index profile; n graded index profile; w graded index profile.

13. A sensing system as claimed in claim 12, wherein the single mode optical fiber core, and the multimode optical fiber core, are concentric.

14. A method of sensing performed at a same time along an optical fiber, the method comprising the steps of:
i) providing an optical fiber comprising:
a single mode optical fiber core having a diameter of from 3 µm to 20 µm and a numerical aperture of from 0.1 to 0.18,
a multimode optical fiber core diameter of from 30 µm to 100 µm and a numerical aperture of from 0.15 to 0.3, and
an optical fiber cladding layer surrounding the single mode optical fiber core and
the multimode optical fiber core; and
ii) using said optical fiber for sensing a plurality of parameters along the optical fiber at the same time, wherein at least one of said parameters is a single mode parameter sensed by the single mode optical fiber core using a Rayleigh scattering technique and at least one of said parameters is a multimode parameter sensed by the multimode optical fiber core using a Raman scattering technique; and
wherein the single mode parameter and the multimode parameter are different.

15. A method as claimed in claim 14, wherein the sensing is performed at the same location and/or the same time.

16. A method as claimed in claim 15, wherein at least one of said sensed multiple parameters is used to affect the interpretation of at least one other of said sensed multiple parameters.

17. A method as claimed in claim 16, wherein said affecting the interpretation comprises at least one selected from the range: calibration; compensation; validation; correction; background correction; noise removal; normalisation; polishing; artefact removal; pattern recognition.

* * * * *